US00RE50215E

(19) United States
(12) Reissued Patent
Shin

(10) Patent Number: US RE50,215 E
(45) Date of Reissued Patent: Nov. 19, 2024

(54) PROTOCOL PROCESSING METHOD AND APPARATUS FOR MULTI-SIM TERMINAL

(71) Applicant: Samsung Electronics Co., Ltd., Gyeonggi-do (KR)

(72) Inventor: Sang Min Shin, Gyeonggi-do (KR)

(73) Assignee: Samsung Electronics Co., Ltd., Suwon-si (KR)

(21) Appl. No.: 17/178,560

(22) Filed: Feb. 18, 2021

Related U.S. Patent Documents

Reissue of:

(64) Patent No.: 8,862,127
Issued: Oct. 14, 2014
Appl. No.: 12/877,313
Filed: Sep. 8, 2010

(30) Foreign Application Priority Data

Sep. 25, 2009 (KR) ..... 10-2009-0091027

(51) Int. Cl.
*H04W 36/00* (2009.01)
*H04W 8/18* (2009.01)
(Continued)

(52) U.S. Cl.
CPC . *H04W 36/0085* (2018.08); *H04W 36/00835* (2018.08); *H04W 48/16* (2013.01);
(Continued)

(58) Field of Classification Search
CPC ..... H04W 36/00835; H04W 36/0085; H04W 36/0083; H04W 48/16; H04W 88/06; H04W 60/005; H04W 8/183; H04W 24/00
See application file for complete search history.

(56) References Cited

U.S. PATENT DOCUMENTS 6,185,436 B1 * 2/2001 Vu ..... 455/558
7,454,207 B2 * 11/2008 Gallagher ..... H04L 63/102 370/352
(Continued)

FOREIGN PATENT DOCUMENTS

CN 101198136 A 6/2008
CN 101247591 A 8/2008
(Continued)

OTHER PUBLICATIONS

Korean Office Action Dated: Jun. 22, 2015.
(Continued)

*Primary Examiner* — Charles R Craver
(74) *Attorney, Agent, or Firm* — Cha & Reiter, LLC

(57) ABSTRACT

A protocol processing method and apparatus are disclosed for a multi-SIM terminal holding multiple subscriber identification cards. The method includes: determining whether all the subscriber identification cards are associated with the same base station (e.g., a Public Land Mobile Network); and conducting, when all the subscriber identification cards are associated with the same base station, frequency scanning and measurement for a selected one of the subscriber identification cards, and sharing the results of frequency scanning and measurement with all the subscriber identification cards. Hence, the multi-SIM terminal may reduce battery power consumption without repeated frequency
(Continued)

scanning and measurement for multiple subscriber identification cards.

8 Claims, 2 Drawing Sheets

(51) Int. Cl.
*H04W 24/00* (2009.01)
*H04W 48/16* (2009.01)
*H04W 60/00* (2009.01)
*H04W 88/06* (2009.01)

(52) U.S. Cl.
CPC ..... *H04W 8/183* (2013.01); *H04W 24/00* (2013.01); *H04W 60/005* (2013.01); *H04W 88/06* (2013.01); *Y02D 30/70* (2020.08)

(56) References Cited

U.S. PATENT DOCUMENTS 7,489,930 B2 * 2/2009 Aerrabotu ..... H04W 36/00835 455/445
7,738,846 B2 * 6/2010 Kaaja et al. ..... 455/161.1
8,140,120 B2 * 3/2012 Ji ..... H04W 48/18 455/67.11
8,170,616 B2 * 5/2012 Lee ..... H04W 60/005 455/552.1
8,527,005 B2 * 9/2013 Shin ..... H04W 76/10 455/414.1
8,676,180 B2 * 3/2014 Srinivasan ..... H04M 3/42382 455/415
8,755,836 B2 * 6/2014 Shin ..... H04W 4/02 455/552.1
8,855,725 B2 * 10/2014 Kim ..... H04B 1/3816 455/67.11
2005/0176466 A1 * 8/2005 Verloop ..... H04W 48/18 455/558
2007/0298801 A1 * 12/2007 Kim ..... H04W 60/00 455/436
2008/0045210 A1 2/2008 Kaaja et al.
2009/0061932 A1 * 3/2009 Nagarajan ..... H04M 1/724 455/558
2009/0270072 A1 * 10/2009 Hsu ..... H04L 63/083 455/411
2009/0305737 A1 * 12/2009 Bae ..... H04W 4/20 455/552.1
2009/0310563 A1 * 12/2009 Chou et al. ..... 370/331
2009/0312020 A1 * 12/2009 Lee ..... H04W 60/005 455/435.2
2010/0009716 A1 * 1/2010 Lee ..... H04W 4/20 455/558
2010/0173671 A1 * 7/2010 Cha ..... H04W 52/0245 455/574
2010/0273524 A1 * 10/2010 Bae et al. ..... 455/552.1
2010/0279698 A1 * 11/2010 Wong ..... H04W 88/06 455/450
2011/0077031 A1 * 3/2011 Kim et al. ..... 455/458
2011/0086670 A1 * 4/2011 Shin ..... H04W 8/205 455/558

FOREIGN PATENT DOCUMENTS

GB 2 439 370 A 12/2007
KR 10-2004-0003222 A 1/2004
KR 10-0470418 1/2005 ..... H04Q 7/32
KR 10-0470418 B1 1/2005
KR 10-0703608 3/2007 ..... H04B 1/40
KR 10-0703608 B1 3/2007
KR 10-2007-0076176 A 7/2007
KR 2007-76176 7/2007 ..... H04B 7/26
KR 10-0793093 B1 1/2008
WO 2008/001061 A1 1/2008 ..... H04Q 7/3226

OTHER PUBLICATIONS

Korean Office Action Dated: Nov. 27, 2015.
Korean Notice of Patent Grant Dated: Jan. 11, 2016.
European Search Report Dated: Jul. 26, 2016.

* cited by examiner

PROTOCOL PROCESSING METHOD AND APPARATUS FOR MULTI-SIM TERMINAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM OF PRIORITY

[This application claims, pursuant to 35 U.S.C. §119(a), priority to, and the benefit of the earlier filing date of, that Korean patent application filed in the Korean Intellectual Property Office on Sep. 25, 2009 and assigned Serial No. 2009-0091027, the entire disclosure of which is hereby incorporated by reference.]*This application is a Reissue application of U.S. Pat. No. 8,862,127 issued on Oct. 14, 2014 from U.S. patent application Ser. No. 12/877,313 filed on Sep. 8, 2010 which claims priority to Korean Application Serial No. 10-2009-0091027, filed in the Korean Intellectual Property Office on Sep. 25, 2009, the content of each are hereby incorporated by reference.*

BACKGROUND OF THE INVENTION

1. Field of the Invention

The present invention relates to the field of portable terminals and more particularly, to a method and apparatus for protocol processing in a terminal that is equipped with multiple subscriber identification cards.

2. Description of the Related Art

Regular mobile communication terminals employ a single subscriber identification card. However, advances in mobile communication technology have enabled development of various types of mobile communication terminals, such as dual-mode terminals, multi-standby terminals and multi-SIM terminals. A dual-mode terminal may use one of two subscriber identification cards according to a user selection. A multi-standby terminal may make multiple subscriber identification cards active simultaneously for calls. A multi-SIM terminal includes a radio frequency unit and a baseband chip, and holds multiple subscriber identification cards. Particularly, in the multi-SIM terminal, the single radio frequency unit is alternately shared by multiple subscriber identification cards. For example, when a dual-SIM terminal holding first and second subscriber identification cards is turned on, it may perform frequency scanning and measurement for the first subscriber identification card to register the first subscriber identification card in the base station, and perform frequency scanning and measurement for the second subscriber identification card to register the second subscriber identification card in the base station. After registering the first and second subscriber identification cards, the dual-SIM terminal may perform neighbor cell scanning and measurement. However, frequency scanning and measurement, and neighbor cell scanning and measurement cause a large amount of battery power consumption. That is, as a conventional multi-SIM terminal performs frequency scanning and measurement, and neighbor cell scanning and measurement repeatedly for individual subscriber identification cards, the multi-SIM terminal may consume a large amount of battery power.

Additionally, in a multi-SIM terminal, when the radio frequency unit is used for a call on one of the subscriber identification cards, radio communication channels related to the remaining subscriber identification cards may be released. That is, when an existing multi-SIM terminal handles a call on one of multiple subscriber identification cards, it may release radio communication channels related to the remaining subscriber identification cards. This unexpected channel release may prevent the corresponding base station from keeping track of the remaining subscriber identification cards, causing network confusion.

SUMMARY OF THE INVENTION

The present invention has been made in view of the above problems, and the present invention provides a protocol processing method and apparatus for a multi-SIM terminal that enable the multi-SIM terminal to reduce battery power consumption by sharing the results of frequency scanning and measurement conducted for one subscriber identification card with other subscriber identification cards without repeated frequency scanning and measurement.

The present invention also provides a protocol processing method and apparatus for a multi-SIM terminal that direct the multi-SIM terminal to send, when the radio frequency unit is used to handle a call on one subscriber identification card, a message indicating temporary release of communication channels associated with the remaining subscriber identification cards to the corresponding base station so as to avoid network confusion by preventing the base station from losing track of the subscriber identification cards.

In accordance with an exemplary embodiment of the present invention, there is provided a protocol processing method for a multi-SIM terminal holding multiple subscriber identification cards, including: determining whether all the subscriber identification cards are associated with the same base station; and conducting, when all the subscriber identification cards are associated with the same base station, frequency scanning and measurement for a selected one of the subscriber identification cards, and sharing the results of frequency scanning and measurement with all the subscriber identification cards.

In accordance with another exemplary embodiment of the present invention, there is provided a protocol processing apparatus for a multi-SIM terminal holding multiple subscriber identification cards, including: a radio frequency unit conducting frequency scanning and measurement; a network information examiner determining whether all the subscriber identification cards are associated with the same base station; and a control unit controlling, when all the subscriber identification cards are associated with the same base station, a process of conducting frequency scanning and measurement for a selected one of the subscriber identification cards, and sharing the results of frequency scanning and measurement with all the subscriber identification cards.

In another aspect of the invention, a multi-SIM portable terminal is disclosed. The terminal includes a transmitter/receiving unit for establishing a communication link with at least one base station; a processor in communication with a memory, the memory including code, which when accessed by the processor causes the processor to: determine which of the multi-SIMs are associated with a same one of the at least one base station and which of the multi-SIMs are associated with a different one of the at least one base station; perform a frequency scan and measurement for one of each multi-SIM associated with each of the different base stations; share the results of the frequency scan and measurement for each of the multi-SIMs associated with the same base station; receive a call message, through the transmitter/receiver, from a base station associated with at least one of the multi-SIM cards; and transmit, through the transmitter/receiver, a release message to each base station associated with a multi-SIM not associated with the call message.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION OF THE INVENTION

Exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

The description of the various embodiments is to be construed as exemplary only and does not describe every possible instance of the invention. Therefore, it should be understood that various changes may be made and equivalents may be substituted for elements of the invention and are considered to be within the scope of the invention as claimed.

In the description, a dual-SIM terminal holding two subscriber identification cards is used as an example of the multi-SIM terminal. However, the present invention is not limited thereto. It should be apparent to those skilled in the art that the present invention is also applicable to a multi-SIM terminal holding three or more subscriber identification cards.

In the description, a subscriber identification card refers to a device storing authentication information of a subscriber. A subscriber identification card may also be referred to as a subscriber identity module (SIM), a universal subscriber identity module (USIM) or a user identity module (UIM). For the purpose of description, only the term "subscriber identification card" is used.

Figure 1:
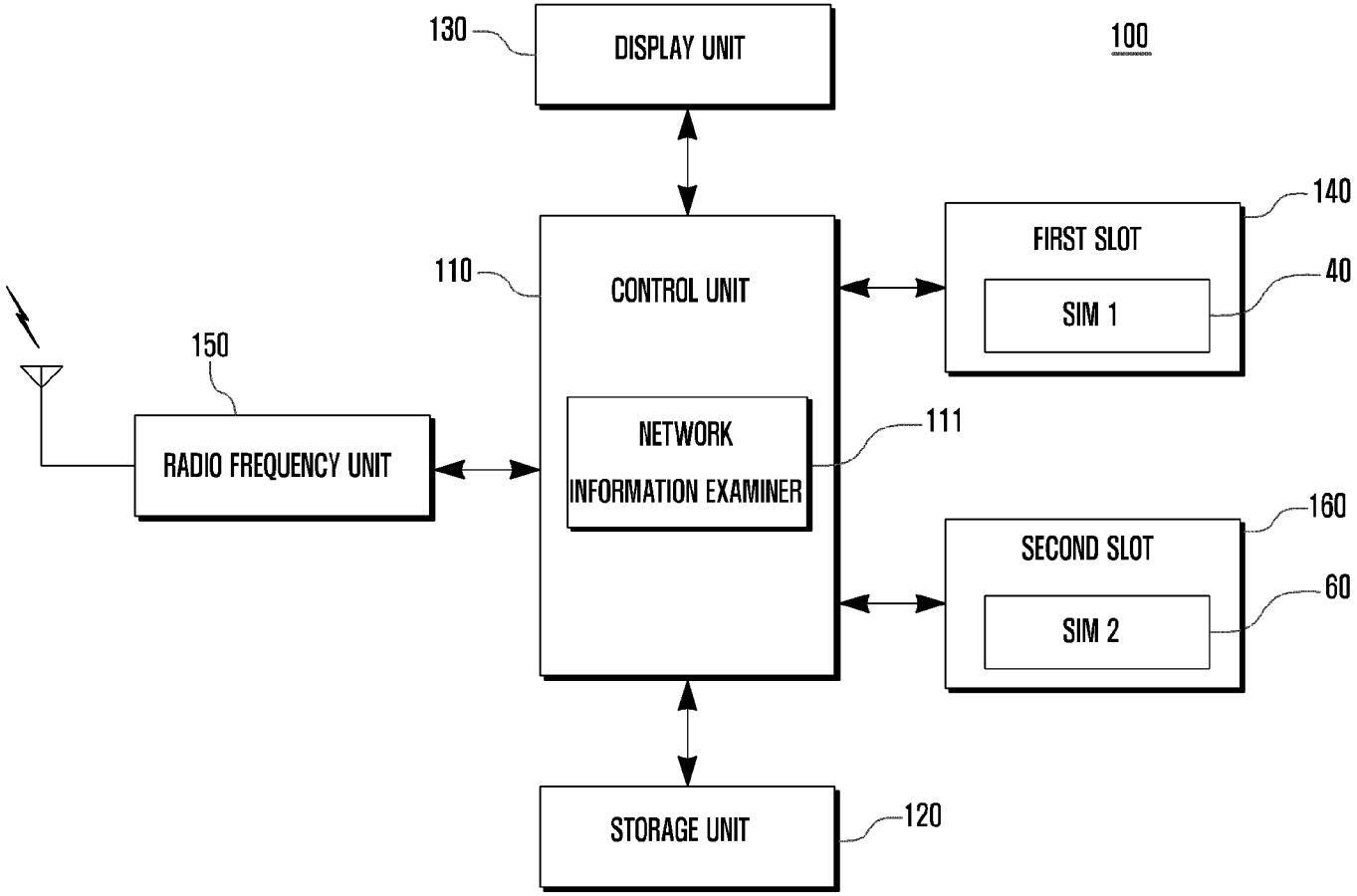
FIG. 1 is a block diagram of a dual-SIM terminal according to an exemplary embodiment of the present invention.

FIG. 1 is a block diagram of a dual-SIM terminal 100 according to an exemplary embodiment of the present invention.

Referring to FIG. 1, the dual-SIM terminal 100 may include a radio frequency unit 150, a first slot 140 for holding a first subscriber identification card 40, a second slot 160 for holding a second subscriber identification card 60, a display unit 130, a storage unit 120, and a control unit 110.

The first slot 140 and the second slot 160 hold subscriber identification cards. The first slot 140 acts as an interface connecting the first subscriber identification card 40 with the control unit 110, and the second slot 160 acts as an interface connecting the second subscriber identification card 60 with the control unit 110. The first and second subscriber identification cards 40 and 60 may be adapted to the same mobile communication scheme. For example, the first and second subscriber identification cards 40 and 60 may be adapted to one of mobile communication schemes such as Global System for Mobile communications (GSM), General Packet Radio Services (GPRS), Enhanced Data rates for GSM Evolution (EDGE), Universal Mobile Telecommunications System (UMTS), Code Division Multiple Access (CDMA), and Wideband Code Division Multiple Access (WCDMA). It is assumed that the first subscriber identification card 40 is installed in the first slot 140 and the second subscriber identification card 60 is installed in the second slot 160.

The radio frequency unit 150 sends and receives radio signals to and from a wireless communication network. The radio frequency unit 150 may include a duplexer (not shown) for isolating a transmit signal from a receive signal, a radio frequency (RF) transmitter (not shown) for up-converting the frequency of a signal to be transmitted and amplifying the signal, and an RF receiver (not shown) for low-noise amplifying a received signal and down-converting the frequency of the received signal. The radio frequency unit 150 may conduct frequency scanning and measurement when the dual-SIM terminal 100 is booted, located in a non-service coverage area, or moved from a non-service coverage area to a service coverage area. On the basis of the results of frequency scanning and measurement, the radio frequency unit 150 may register the first and second subscriber identification card 40 and 60 in the base station providing the best communication channel environment (for example, highest receive signal level) under the control of the control unit 110. Particularly, in the case that the first subscriber identification card 40 and the second subscriber identification card 60 are associated with the same mobile network operator (i.e., the same base station), the radio frequency unit 150 may apply the results of frequency scanning and measurement obtained using one of the first and second subscriber identification cards 40 and 60 to the other subscriber identification card under the control of the control unit 110 (that is, the subscriber identification cards share the results of frequency scanning and measurement). When the first subscriber identification card 40 and the second subscriber identification card 60 are associated with different base stations, the radio frequency unit 150 may conduct frequency scanning and measurement separately for the first subscriber identification card 40 and the second subscriber identification card 60, independently. Frequency scanning may include a search for available frequencies in the vicinity of the dual-SIM terminal 100, and measurement of the signal level on the found frequency. When a call request is made on one of the first subscriber identification card 40 and the second subscriber identification card 60, the radio frequency unit 150 may send a message indicating release of a communication channel related to the subscriber identification card not receiving the call to the corresponding base station under the control of the control unit 110.

The display unit 130 may display various menus of the dual-SIM terminal 100, information input by the user, function setting information, and information to be provided to the user. For example, the display unit 130 may display a boot screen, idle screen, menu screen, and video call handling screen. The display unit 130 may be realized using liquid crystal display (LCD) devices or organic light emitting diodes (OLED) or other similar type displays (e.g., LED). When the display unit 130 has a touch screen capability, it may act as an input means. Touch screen technology is well-known in the art and details of the operation and/or implementation of such technology need not be provided herein to understand the operating principles of the subject matter recited in the claims.

The storage unit 120 may store the operating system (OS) of the dual-SIM terminal 100, application programs for optional functions (related to, for example, sound reproduction, display of images or playback of moving images, and broadcast reception), user data, and data generated during communication. In particular, the storage unit 120 may store a program that controls frequency scanning and measurement of the radio frequency unit 150 according to whether the first subscriber identification card 40 and the second subscriber identification card 60 are associated with the same base station. The storage unit 120 may also store information regarding base station selection, cell selection, cell reselection, and neighbor cell measurement for the first subscriber identification card 40 and the second subscriber identification card 60.

The control unit 110 controls the overall operation of the dual-SIM terminal 100, signal exchange between internal components thereof, and processing of data sent and received through the radio frequency unit 150. In particular, during execution of a boot procedure, the control unit 110 may check whether the first subscriber identification card 40 and the second subscriber identification card 60 are associated with the same base station. To achieve this, the control unit 110 may include a network information examiner 111. The network information examiner 111 may check whether the first and second subscriber identification cards 40 and 60 are associated with the same base station by comparing International Mobile Subscriber Identity (IMSI) information of the first subscriber identification card 40 with that of the second subscriber identification card 60. To be more specific, when the Mobile Network Code (MNC) in the IMSI information of the first subscriber identification card 40 is equal to that in the IMSI information of the second subscriber identification card 60, the network information examiner 111 may determine that the first and second subscriber identification cards 40 and 60 are associated with the same base station. Alternatively, when the Mobile Network Code for the first subscriber identification card 40 is different from that for the second subscriber identification card 60, the network information examiner 111 may determine that the first and second subscriber identification cards 40 and 60 are associated with different base stations. Here, the IMSI information is widely known to those skilled in the art, and a description thereof is omitted. In addition, the network information examiner 111 may also determine whether the first and second subscriber identification cards 40 and 60 are associated with the same base station by comparing network operator information such as the service provider name (SPN) stored in the first subscriber identification card 40 with that stored in the second subscriber identification card 60.

When the first and second subscriber identification cards 40 and 60 are determined to be associated with the same base station, the control unit 110 may control an operation to apply the results of frequency scanning and measurement obtained using one of the first and second subscriber identification cards 40 and 60 to the other subscriber identification card (i.e., sharing of frequency scanning and measurement results). When the first and second subscriber identification cards 40 and 60 are determined to be associated with different base stations, the control unit 110 may control an operation to conduct frequency scanning and measurement for the first subscriber identification card 40 and the second subscriber identification card 60 separately.

When the first and second subscriber identification cards 40 and 60 are registered in the mobile communication network through frequency scanning and measurement and the boot procedure is completed, the control unit 110 may enter the idle state. In the idle state, the control unit 110 may have the first subscriber identification card 40 and the second subscriber identification card 60 active simultaneously for calls. In the idle state, the control unit 110 may periodically conduct location information update (Location Area Update or Router Area Update), base station selection, cell selection, cell reselection, and neighbor cell measurement separately for the first subscriber identification card 40 and the second subscriber identification card 60. The results obtained by a background process in the idle state may not be shared among the first subscriber identification card 40 and the second subscriber identification card 60. Alternatively, on the basis of the results of neighbor cell scanning and measurement for the first subscriber identification card 40, the control unit 110 may conduct cell reselection for the second subscriber identification card 60. That is, the results of neighbor cell scanning and measurement may be shared among the first subscriber identification card 40 and the second subscriber identification card 60.

When a call request is made on one of the first subscriber identification card 40 and the second subscriber identification card 60 (for purposes of describing the invention claimed, operation using the first subscriber identification card 40 is described with regard to the call request) in the idle state, the control unit 110 may control the radio frequency unit 150 to send an IMSI Detach message indicating release of a communication channel assigned to the other subscriber identification card (i.e., the second subscriber identification card 60) to the base station before establishing the call channel. When the call ends, in the case that the first and second subscriber identification cards 40 and 60 are associated with the same base station, the control unit 110 may control an operation to register the second subscriber identification card 60 in the mobile communication network utilizing base station and cell information of the first subscriber identification card 40. In the case that the first and second subscriber identification cards 40 and 60 are not associated with the same base station, the control unit 110 may control the radio frequency unit 150 to conduct frequency scanning and measurement for the second subscriber identification card 60, and to register the second subscriber identification card 60 in the mobile communication network on the basis of the results of frequency scanning and measurement.

Hereinabove, a description is given of the configuration of the dual-SIM terminal 100. Next, a description is given of a protocol processing method for the dual-SIM terminal 100.

Figure 2:
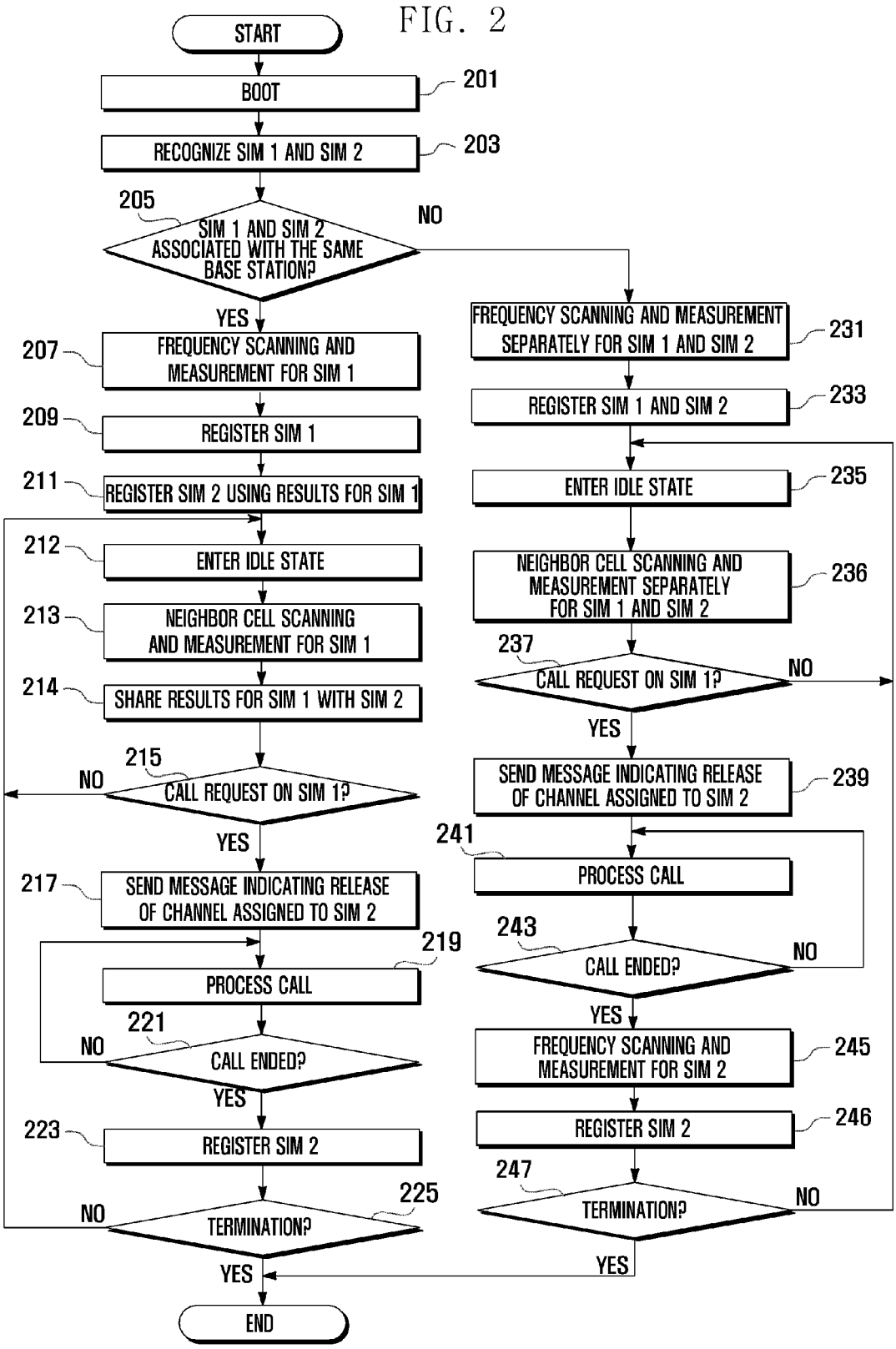
FIG. 2 is a flow chart of a protocol processing method for the dual-SIM terminal according to another exemplary embodiment of the present invention.

FIG. 2 is a flow chart of a protocol processing method for the dual-SIM terminal 100 according to another exemplary embodiment of the present invention.

Referring to FIGS. 1 and 2, when the dual-SIM terminal 100 is turned on, the control unit 110 executes a boot procedure (201), and recognizes the first subscriber identification card 40 and the second subscriber identification card 60 (203). Recognition of a subscriber identification card is widely known to those skilled in the art, and a description thereof is omitted.

The control unit 110 checks whether the first and second subscriber identification cards 40 and 60 are associated with the same public land mobile network (PLMN) (referred to as a base station) (205). For example, when the Mobile Network Code (MNC) in the IMSI information of the first subscriber identification card 40 is equal to that in the IMSI information of the second subscriber identification card 60, the control unit 110 may determine that the first and second subscriber identification cards 40 and 60 are associated with the same base station. The control unit 110 may also determine whether the first and second subscriber identification cards 40 and 60 are associated with the same base station by comparing network operator information such as the service provider name (SPN) stored in the first subscriber identification card 40 with that stored in the second subscriber identification card 60.

When the first and second subscriber identification cards 40 and 60 are associated with the same base station, the control unit 110 controls the radio frequency unit 150 to conduct frequency scanning and measurement for the first subscriber identification card 40 (207). Here, frequency scanning and measurement may include a search for available frequencies in the vicinity of the dual-SIM terminal 100, and measurement of the signal level at the found frequency.

The control unit 110 selects a base station or cell providing the best communication channel environment on the basis of the results of frequency scanning and measurement to register the first subscriber identification card 40 in the mobile communication network (209), and registers the second subscriber identification card 60 in the mobile communication network utilizing the results of frequency scanning and measurement obtained for the first subscriber identification card 40 (211). In the above description, frequency scanning and measurement is conducted for the first subscriber identification card 40 and the results are applied to the first and second subscriber identification cards 40 and 60. However, the present invention is not limited thereto. That is, frequency scanning and measurement may be conducted for the second subscriber identification card 60 and the results may be applied to the first and second subscriber identification cards 40 and 60.

When the boot procedure is completed, the control unit 110 enters the idle state (212). The control unit 110 conducts neighbor cell scanning and measurement for the first subscriber identification card 40 (213), and applies the results of neighbor cell scanning and measurement to the first subscriber identification card 40 and the second subscriber identification card 60 (214). For example, the control unit 110 may conduct cell reselection for the second subscriber identification card 60 on the basis of the results of neighbor cell scanning and measurement obtained for the first subscriber identification card 40. Thereafter, the control unit 110 may alternately assign the radio frequency unit 150 to the first and second subscriber identification cards 40 and 60 to conduct location information update (Location Area Update or Router Area Update), base station selection, and cell selection.

The control unit 110 checks whether a call request is made on the first subscriber identification card 40 (215). Here, the call request may correspond to placement or reception of a call to or from another terminal. When a call request is not made, the control unit 110 returns to step 213, or may perform a requested operation such as music file playback or image capture. When a call request is made on the first subscriber identification card 40, the control unit 110 performs an IMSI Detach procedure for the second subscriber identification card 60 (217). That is, the control unit 110 may control the radio frequency unit 150 to send a message indicating release of a channel connection assigned to the second subscriber identification card 60 to the base station. Thereby, the present invention can avoid network confusion that may occur if the base station loses track of the second subscriber identification card 60 while the radio frequency unit 150 is not available to the second subscriber identification card 60. For example, when a call request is made on the second subscriber identification card 60 while the user of the dual-SIM terminal 100 is still in conversation during a call on the first subscriber identification card 40, the base station may send a busy signal to that terminal making the call request.

The control unit 110 establishes a communication channel to the base station and processes the call on the first subscriber identification card 40 (219). The control unit 110 checks whether the call is ended (221). When the call is not ended, the control unit 110 returns to step 219 for continued call processing. When the call is ended, the control unit 110 releases the call connection for the first subscriber identification card 40 and registers the second subscriber identification card 60 in the base station (223). Here, the control unit 110 may register the second subscriber identification card 60 in the mobile communication network on the basis of information on the base station in which the first subscriber identification card 40 is registered.

The control unit 110 checks whether a termination command is input (225). When a termination command is input, the control unit 110 performs a termination procedure. When a termination command is not input, the control unit 110 returns to step 212 for continued processing.

When the first and second subscriber identification cards 40 and 60 are not associated with the same base station at step 205, the control unit 110 conducts frequency scanning and measurement for the first subscriber identification card 40 and also conducts frequency scanning and measurement for the second subscriber identification card 60 (231), and subscribes the first subscriber identification card 40 and the second subscriber identification card 60 appropriately in the mobile communication network (233).

After completion of the boot procedure by registration of the subscriber identification cards, the control unit 110 enters the idle state (235). The control unit 110 conducts neighbor cell scanning and measurement separately for the first subscriber identification card 40 and for the second subscriber identification card 60 (236). Here, the control unit 110 may alternately assign the radio frequency unit 150 to the first and second subscriber identification cards 40 and 60 so as to periodically conduct location information update (Location Area Update or Router Area Update), base station selection, and cell selection separately for the first subscriber identification card 40 and for the second subscriber identification card 60.

The control unit 110 checks whether a call request is made on the first subscriber identification card 40 (237). When a call request is not made, the control unit 110 returns to step 235, or may perform a requested operation such as music file playback or image capture. When a call request is made on the first subscriber identification card 40, the control unit 110 controls the radio frequency unit 150 to send an IMSI Detach message indicating release of a channel connection assigned to the second subscriber identification card 60 to the base station (239). Transmission of the channel connection release message may contribute to avoidance of network confusion that may occur if the base station loses track of the second subscriber identification card 60 while the radio frequency unit 150 is not available to the second subscriber identification card 60. For example, when a call request is made on the second subscriber identification card 60 while the user of the dual-SIM terminal 100 is still engaged in a call on the first subscriber identification card 40, the base station may send a busy signal to that terminal making the call request.

The control unit 110 establishes a communication channel to the base station and processes the call on the first subscriber identification card 40 (241). The control unit 110 checks whether the call is ended (243). When the call is not ended, the control unit 110 returns to step 241 for continued call processing. When the call is ended, the control unit 110 releases the call connection for the first subscriber identification card 40 and conducts frequency scanning and measurement for the second subscriber identification card 60 (245). The control unit 110 registers the second subscriber identification card 60 in the mobile communication network on the basis of the results of frequency scanning and measurement (246).

The control unit 110 checks whether a termination command is input (247). When a termination command is input, the control unit 110 performs a termination procedure. When a termination command is not input, the control unit 110 returns to step 235 for continued processing.

In the above description, a call request is made on the first subscriber identification card 40. However, the present invention is not limited thereto. That is, the above procedure may readily handle the case where a call request is made on the second subscriber identification card 60.

Hereinabove, a description is given of a dual-SIM terminal holding two subscriber identification cards. However, the present invention is not limited thereto. That is, the present invention is also applicable to a multi-SIM terminal holding three or more subscriber identification cards. Additionally, in the case of a dual-standby terminal employing identical communication schemes (for example, a GSM-GSM dual-standby terminal), when the two subscriber identification cards have the same network operator information, the results of frequency scanning and measurement obtained by the radio frequency unit may be shared by the two subscriber identification cards.

As apparent from the above description, the protocol processing method and apparatus enable the multi-SIM terminal to reduce battery power consumption due to repeated frequency scanning and measurement for multiple subscriber identification cards. In addition, when the radio frequency unit is used to handle a call on one subscriber identification card, the multi-SIM terminal sends a message (for example, an IMSI Detach message) indicating temporary release of communication channels associated with the remaining subscriber identification cards to the corresponding base station. Hence, network confusion may be avoided by preventing the base station from losing track of the subscriber identification cards.

The above-described methods according to the present invention can be realized in the controller that is realized in hardware or as software or computer code that can be stored in a recording medium such as a CD ROM, an RAM, a floppy disk, a hard disk, or a magneto-optical disk or downloaded over a network (i.e., The computer program can be provided from an external source which is electronically downloaded over a network, e.g., Internet, POTS, so that the methods described herein can be rendered in such software using a general purpose computer, or a special processor or in programmable or dedicated hardware, such as an ASIC or FPGA. As would be understood in the art, controller, as represented by the computer, the processor or the programmable hardware may include memory components, e.g., RAM, ROM, Flash, etc. that may store or receive software or computer code that when accessed and executed by the computer, processor or hardware implement the processing methods described herein. The code when loaded into a general purpose computer transformed the general purpose computer into a special purpose computer that may in part be dedicated to the processing shown herein. In addition, controller, as represented by the computer, the processor or the dedicated hardware may be composed of at least one of a single processor, a multi-processor, and a multi-core processor.

Although the invention has been described with regard to two SIM cards and the two cards may be associated with the same or different base stations. However, it would be recognized that when multiple-SIM cards (i.e., greater than two SIM cards) are included then one or more of the multiple SIM cards may be associated with one base station and each of the remaining SIM cards may be associated with a different base station or with one or more base stations. Hence, when calls are placed with one SIM card, then the other SIM cards may be disconnected, as previously described, and then when the call is terminated, the scanning of the frequencies for re-connection to the other base stations may consider that one or more of the remaining SIM cards may belong to the base station and, thus, frequency results of one SIM card may be shared with the other remaining SIM cards that share the same base station.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

[1. A multi-SIM portable terminal holding multiple subscriber identification cards, comprising:

a transmitter/receiving unit for establishing a communication link with at least one base station;

a processor in communication with a memory, the memory including code, which when accessed by the processor causes the processor to:

determine which of the subscriber identification cards are associated with the same base station and which of the subscriber identification cards are registered in different base stations;

responsive to all the subscriber identification cards being determined to be associated with the same base station, conduct frequency scanning and measurement for a selected one of the subscriber identification cards and register all the subscriber identification cards with the same base station based on results of the frequency scanning and measurement for the selected one of the subscriber identification cards;

responsive to determining that any subscriber identification cards are associated with different base stations, perform a frequency scan and measurement for only one of each subscriber identification card determined to be associated with each of the different base stations;

share results of the frequency scan and measurement for each of the subscriber identification cards determined to be associated with a respective one of the different base stations;

receive a call message, through the transmitter/receiver, from a base station associated with at least one of the subscriber identification cards; and transmit, through the transmitter/receiver, a release message to each base station associated with a subscriber identification card not associated with the call message.]

[2. The terminal of claim 1, further comprising:

code when accessed by the processor, causing the processor to:

perform a frequency scan and measurement for one of each multi-SIM determined to be registered in each of the base stations not associated with the call message upon completion of the call; and share the results of the frequency scan and measurement for each of the subscriber identification cards determined to be registered in the same base station.]

[3. A protocol processing method, operable in a processor, of a multi-SIM terminal holding multiple subscriber identification cards, comprising:

determining whether all the subscriber identification cards are associated with the same base station or not; and responsive to all the subscriber identification cards being determined to be associated with the same base station, conducting frequency scanning and measurement for a selected one of the subscriber identification cards and registering all the subscriber identification cards with the same base station based on results of the frequency scanning and measurement for the selected one of the subscriber identification cards.]

[4. The protocol processing method of claim 3, further comprising conducting, when all the subscriber identification cards are determined not to be associated with the same base station, frequency scanning and measurement for each of the subscriber identification cards.]

[5. The protocol processing method of claim 4, further comprising conducting, after registration with a mobile communication network when all the subscriber identification cards are determined not to be associated with the same base station, neighbor cell scanning and measurement for each of the subscriber identification cards.]

[6. The protocol processing method of claim 3, wherein determining whether all the subscriber identification cards are associated with the same base station comprises one of:

checking whether Mobile Network Codes in International Mobile Subscriber Identity (IMSI) information of the subscriber identification cards are the same; and checking whether Service Provider Names stored in the subscriber identification cards are the same.]

[7. The protocol processing method of claim 3, further comprising:

making a call request on one of the subscriber identification cards; and sending, when the call request is made, a message indicating release of a channel connection assigned to at least one of the remaining subscriber identification cards to the base station.]

[8. The protocol processing method of claim 7, further comprising registering, upon termination of the call, when all the subscriber identification cards are determined to be associated with the same base station, the remaining subscriber identification cards in a mobile communication network on the basis of base station information and cell information of the subscriber identification card involved in the call.]

[9. The protocol processing method of claim 7, further comprising conducting, upon termination of the call when all the subscriber identification cards are determined not to be associated with the same base station, frequency scanning and measurement for each of the remaining subscriber identification cards, and registering each of the remaining subscriber identification cards in a mobile communication network on the basis of results of frequency scanning and measurement.]

[10. The protocol processing method of claim 3, further comprising conducting, after registration with a mobile communication network when all the subscriber identification cards are determined to be associated with the same base station, neighbor cell scanning and measurement for one of the subscriber identification cards, and sharing results of the neighbor cell scanning and measurement with all the subscriber identification cards.]

[11. The method of claim 3, wherein the determining whether all the subscriber identification cards are associated with the same base station is performed as part of a boot procedure that is executed when the multi-SIM terminal is booted.]

[12. A protocol processing apparatus for a multi-SIM terminal holding multiple subscriber identification cards, comprising:

a radio frequency unit conducting frequency scanning and measurement;

a network information examiner module determining whether all the subscriber identification cards are associated with the same base station or not; and a control unit controlling, responsive to all the subscriber identification cards being determined to be associated with the same base station, a process of conducting frequency scanning and measurement for only a selected one of the subscriber identification cards, and registering all subscriber cards with the same base station based on results of the frequency scanning and measurement for the selected one of the subscriber identification cards, and responsive to all the subscriber identification cards being determined not to be associated with the same base station, a process of conducting frequency scanning and measurement for each of the subscriber identification cards.]

[13. The protocol processing apparatus of claim 12, wherein the network information examiner module determines whether all the subscriber identification cards are associated with the same base station on the basis of at least one of Mobile Network Codes in International Mobile Subscriber Identity (IMSI) information of the subscriber identification cards and Service Provider Names stored in the subscriber identification cards.]

[14. The protocol processing apparatus of claim 12, wherein the control unit controls, when a call request is made on one of the subscriber identification cards, the radio frequency unit to send a message indicating release of a channel connection assigned to at least one of the remaining subscriber identification cards to the base station.]

[15. The protocol processing apparatus of claim 14, wherein the control unit registers, upon termination of the call when all the subscriber identification cards are determined to be associated with the same base station, the remaining subscriber identification cards in a mobile communication network on the basis of base station information and cell information of the subscriber identification card involved in the call.]

[16. The protocol processing apparatus of claim 12, wherein the control unit controls, after registration with a mobile communication network when all the subscriber identification cards are determined to be associated with the same base station, a process of conducting neighbor cell scanning and measurement for one of the subscriber identification cards, and sharing results of neighbor cell scanning and measurement with all the subscriber identification cards.]

[17. The protocol processing apparatus of claim 12, wherein the control unit controls, upon termination of the call when all the subscriber identification cards are determined not to be associated with the same base station, the radio frequency unit to conduct frequency scanning and measurement for each of the remaining subscriber identification cards, and to register each of the remaining subscriber identification cards in a mobile communication network on the basis of results of frequency scanning and measurement.]

[18. The protocol processing apparatus of claim 12, wherein the control unit conducts, after registration with a mobile communication network when all the subscriber identification cards are determined not to be associated with the same base station, neighbor cell scanning and measurement for each of the subscriber identification cards.]

*19. A protocol processing method, operable in a processor, of a multi-SIM terminal capable of using a plurality of subscriber identity modules (SIMs) including a first subscriber identity module (SIM) and a second SIM, the method comprising:*

*determining whether the first SIM and the second SIM are associated with a same public land mobile network (PLMN) corresponding to a same base station or not;*

*in case that the first SIM and the second SIM are determined to be associated with the same PLMN,*

*conducting frequency scanning and measurement for the first SIM;*

*registering the first SIM with a base station based at least in part on a result of a frequency scanning and measurement for the first SIM; and*

*registering at least one remaining SIM, including the second SIM, of the plurality of SIMs with the base station using the result of the frequency scanning and measurement for the first SIM,*

*in case that the first SIM and the second SIM are determined not to be associated with the same PLMN,*

*conducting frequency scanning and measurement for the first SIM and the second SIM;*

*registering the first SIM with a base station using a result of the frequency scanning and measurement for the first SIM, and*

*registering the second SIM with another base station using a result of the frequency scanning and measurement for the second SIM.*

*20. The protocol processing method of claim 19, further comprising:*

*after the second SIM is registered, making a call request for the first SIM; and*

*after the call request is made, sending, to the base station, a message to be used to release a channel connection for the second SIM.*

*21. The protocol processing method of claim 20, further comprising:*

*after a call connected by the call request is terminated, conducting frequency scanning and measurement for the second SIM; and*

*registering the second SIM with a mobile communication network corresponding to the same PLMN using a result of the frequency scanning and measurement for the second SIM.*

*22. The protocol processing method of claim 19, wherein the determining whether the first SIM and the second SIM are associated with the same PLMN includes:*

*determining whether a first Mobile Network Codes (MNC) in first International Mobile Subscriber Identity (IMSI) information of the first SIM is the same as a second MNC in second IMSI information of the second SIM.*

*23. A portable communication device comprising:*

*a plurality of subscriber identity modules (SIMs) including a first subscriber identity module (SIM) and a second SIM; and*

*a processor configured to:*

*determine whether the first SIM and the second SIM are associated with a same public land mobile network (PLMN) corresponding to a same base station or not;*

*in case that the first SIM and the second SIM are determined to be associated with the same PLMN,*

*conducting frequency scanning and measurement for the first SIM;*

*register the first SIM with the same base station using a result of frequency scanning and measurement for the first SIM; and*

*register at least one remaining SIM, including the second SIM, of the plurality of SIMs with the same base station using the result of the frequency scanning and measurement for the first SIM,*

*in case that the first SIM and the second SIM are determined not to be associated with the same PLMN,*

*conducting frequency scanning and measurement for the first SIM and the second SIM;*

*register the first SIM with a base station using a result of the frequency scanning and measurement for the first SIM, and*

*register the second SIM with another base station using a result of a frequency scanning and measurement for the second SIM.*

*24. The portable communication device of claim 23, wherein the processor is configured to:*

*after the second SIM is registered, make a call request for the first SIM; and*

*after the call request is made, send, to the base station, a message to be used to release a channel connection for the second SIM.*

*25. The portable communication device of claim 24, wherein the processor is configured to:*

*after a call connected by the call request is terminated, conduct frequency scanning and measurement for the second SIM; and*

*register the second SIM with a mobile communication network corresponding to the same PLMN using a result of the frequency scanning and measurement for the second SIM.*

*26. The portable communication device of claim 23, wherein the processor is configured to:*

*as at least part of the determining whether the first SIM and the second SIM are associated with the same PLMN, determine whether a first Mobile Network Code (MNC) in first International Mobile Subscriber Identity (IMSI) information of the first SIM is the same as a second MNC in second IMSI information of the second SIM.*

* * * * *